(12) United States Patent
Yang et al.

(10) Patent No.: US 12,704,714 B2
(45) Date of Patent: Aug. 11, 2026

(54) OPTICAL SYSTEM AND VIRTUAL REALITY DEVICE

(71) Applicant: GOERTEK INC., Weifang (CN)

(72) Inventors: Chun Yang, Weifang (CN); Qi Sun, Weifang (CN)

(73) Assignee: Goertek Optical Technology Co., Ltd, Weifang (CN)

( * ) Notice: Subject to any disclaimer, the term of this patent is extended or adjusted under 35 U.S.C. 154(b) by 613 days.

(21) Appl. No.: 17/995,124

(22) PCT Filed: Nov. 7, 2020

(86) PCT No.: PCT/CN2020/127357

§ 371 (c)(1),
(2) Date: Sep. 30, 2022

(87) PCT Pub. No.: WO2021/238079

PCT Pub. Date: Dec. 2, 2021

(65) Prior Publication Data

US 2023/0168501 A1 Jun. 1, 2023

(30) Foreign Application Priority Data

May 27, 2020 (CN) ........................ 202020940944.8

(51) Int. Cl.
*G02B 27/01* (2006.01)
*G02B 27/28* (2006.01)

(52) U.S. Cl.
CPC ......... *G02B 27/0101* (2013.01); *G02B 27/28* (2013.01)

(58) Field of Classification Search
CPC ...................................................... G02B 27/00
USPC .......................................................... 359/633
See application file for complete search history.

(56) References Cited

U.S. PATENT DOCUMENTS

2004/0014504 A1 1/2004 Coates et al.
2018/0239146 A1 8/2018 Bierhuizen et al.
2019/0049733 A1 2/2019 Jiang et al.

FOREIGN PATENT DOCUMENTS

CN 105093555 A 11/2015
CN 110308559 A 10/2019
CN 110764266 A 2/2020
EP 0803756 A1 10/1997
EP 1043619 B1 2/2007

(Continued)

OTHER PUBLICATIONS

International Search Report from International Application No. PCT/CN2020/127357 mailed Feb. 25, 2021.

*Primary Examiner* — Bumsuk Won
*Assistant Examiner* — Grant A Gagnon
(74) *Attorney, Agent, or Firm* — Shih IP Law Group, PLLC

(57) ABSTRACT

Disclosed are an optical system and a virtual reality device. The optical system comprises a display unit (10) and a first lens (20), the first lens (20) comprises a first surface (21) and a second surface (22), and the second surface (22) has a planar structure; an optical splitter is provided between the first surface (21) and the display unit (10); a first phase retarder (30) and a polarization reflector (40) are provided at a side of the first lens (20) away from the display unit (10), and the first phase retarder (30) is provided between the first lens (20) and the polarization reflector (40); and light emitted from the display unit (10) enters into the first lens (20) from the first surface (21), and is sequentially reflected by the second surface (22) and the first surface (21), and then exits the optical system from the second surface (22).

10 Claims, 8 Drawing Sheets

(56) References Cited

FOREIGN PATENT DOCUMENTS

| | | | |
|---|---|---|---|
| JP | H1010465 | A | 1/1998 |
| JP | 2019505854 | A | 2/2019 |
| JP | 2019053151 | A | 4/2019 |
| WO | 2017128183 | A1 | 8/2017 |

OPTICAL SYSTEM AND VIRTUAL REALITY DEVICE

TECHNICAL FIELD

The present disclosure relates to the technical field of optical imaging, particularly, to an optical system and a virtual reality device.

BACKGROUND ART

With the development of the virtual reality technology, the forms and types of virtual reality devices are becoming more and more diverse, and the application fields of the virtual reality devices are becoming more and more extensive. The existing virtual reality device usually transmits the output image to the human eyes after the image of the display screen in the device is transmitted and enlarged by the optical system. Therefore, the human eyes receive the enlarged virtual image of the display screen, so that the purpose of large-screen viewing is realized through the virtual reality device.

In order to enlarge the image, the optical system usually needs to be implemented by combining a plurality of lenses. Due to the large volume of the plurality of lenses combined with each other, the volume of the virtual reality device is large. Therefore, not only the portability of the virtual reality device is decreased, but also the wearing comfort for users is decreased.

SUMMARY

The present disclosure provides an optical system and a virtual reality device, and is intended to solve the problems that the volume of the virtual reality device is large, the virtual reality device is not convenient to carry around, and the wearing comfort for users is low cause by the large volume of the optical system in the prior art.

In order to achieve the above objects, the present disclosure proposes an optical system, the optical system comprises a display unit and a first lens sequentially along a light transmission direction, wherein the first lens is provided at a light emitting side of the display unit, the first lens comprises a first surface close to the display unit and a second surface away from the display unit, and the second surface has a planar structure.

An optical splitter is provided between the first surface and the display unit. A first phase retarder and a polarization reflector are provided at a side of the first lens away from the display unit, and the first phase retarder is provided between the first lens and the polarization reflector.

The light emitted from the display unit enters into the first lens from the first surface, and is sequentially reflected by the second surface and the first surface, and then the light exits the optical system from the second surface.

Optionally, the optical system further comprises a movable component connected with the display unit to adjust a distance between the display unit and the first lens.

Optionally, the optical system satisfies the following relationship: $50<ABS(R1)<100$, $ABS(Conic1)<5$, wherein R1 is a curvature radius of the first surface, and ABS(R1) is an absolute value of R1, wherein Conic1 is a conic coefficient of the first surface, and ABS(Conic1) is an absolute value of Conic1.

Optionally, the optical system satisfies the following relationship: $5<T1<10$, wherein T1 is a central thickness of the first lens along an optical axis.

Optionally, the optical system satisfies the following relationship: $10<T2\leq16$, wherein T2 is a distance from the first surface to the display unit.

Optionally, the optical system satisfies the following relationship: $3<L1<5$, wherein L1 is an edge thickness of the first lens.

Optionally, the optical system satisfies the following relationship: $f=6.3*f1$, wherein f is a focal length of the optical system, and f1 is a focal length of the first lens.

Optionally, the optical system further comprises a second lens provided at a light exiting side of the first lens, and the second lens is any one of a plano-convex lens, a plano-concave lens and a meniscus lens.

Optionally, the optical system further comprises a polarizer provided at a side of the polarization reflector away from the phase retarder.

In order to achieve the above objects, the present application proposes a virtual reality device, which comprises a housing and an optical system according to any of the technical solutions described above, wherein the optical system is accommodated in the housing.

In the technical solutions proposed in the present application, the optical system comprises a first lens, which comprises a first surface close to the display unit and a second surface away from the display unit; an optical splitter is provided between the first surface and the display unit; a first phase retarder and a polarization reflector are provided at the side of the first lens away from the display unit is provided with, and the first phase retarder is provided between the first lens and the polarization reflector. By providing the polarization reflector, the first phase retarder and the optical splitter at two sides of the first lens, respectively, the light emitted from the display unit only turns back between the first surface and the second surface of the first lens after entering into the first lens, so that the optical path length of the optical system is increased. Therefore, the performance of the optical system is changed by increasing the optical path length, so that the problems that the volume of the virtual reality device is large, the virtual reality device is not convenient to carry around, and the wearing comfort for users is low cause by the large volume of the optical system in the prior art are solved.

BRIEF DESCRIPTION OF THE DRAWINGS

In order to more clearly illustrate the embodiments of the present disclosure or the technical solutions in the prior art, the attached drawings that need to be used in the embodiments of the present disclosure or the descriptions of the prior art will be briefly described below. It is obvious that the attached drawings in the following description are only some embodiments of the present disclosure. For those skilled in the art, other drawings can be obtained according to the structures shown in these attached drawings without creative labor.

REFERENCE SIGNS IN THE DRAWINGS

Figure 1:
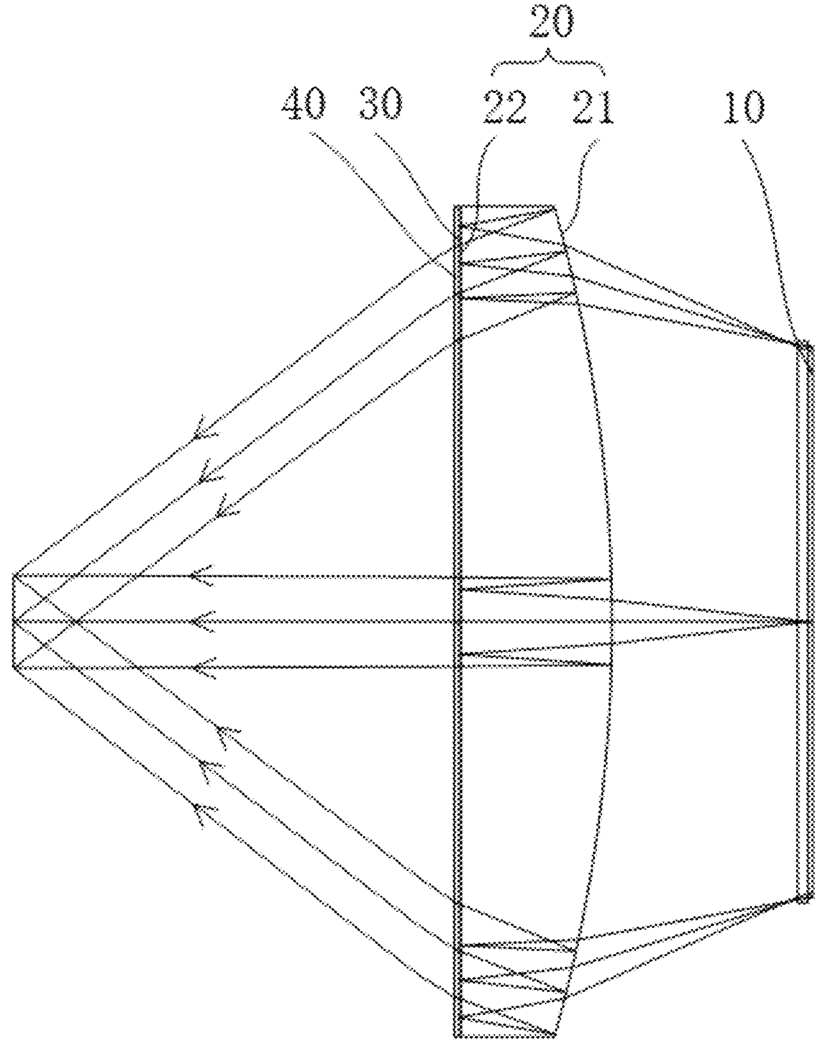
FIG. 1 is a schematic diagram of the optical path of the optical system of the present disclosure.

| Reference Sign | Name |
|---|---|
| 10 | display unit |
| 20 | first lens |
| 21 | first surface |
| 22 | second surface |
| 30 | first phase retarder |
| 40 | polarization reflector |
| 50 | second lens |

The realization of the objects, functional features and advantages of the present disclosure will be further described with reference to the attached drawings in combination with the embodiments.

DETAILED DESCRIPTION OF EMBODIMENTS

The technical solutions in the embodiments of the present disclosure will be clearly and completely described below in combination with the attached drawings in the embodiments of the present disclosure. Obviously, the described embodiments are only a part of the embodiments of the present disclosure, not all of them. Based on the embodiments in the present disclosure, all other embodiments obtained by those skilled in the art without creative labor belong to the protection scope of the present disclosure.

It should be noted that all directional indications (for example, on, below, left, right, front, and rear) in the embodiments of the present disclosure are only used to illustrate the relative position relationship and motion between various components under a specific attitude (as shown in the drawings), and the directional indications will change accordingly when the specific attitude is changed.

In addition, the description such as "first", "second" and the like in the present disclosure is only for descriptive objects, and cannot be understood as indicating or implying the relative importance of the indicated technical feature or implicitly indicating the number of the indicated technical feature. Therefore, the feature defined with "first" or "second" may explicitly or implicitly comprise at least one such feature. In the description of the present disclosure, "a plurality of" means at least two (for example, two, three, etc.), unless otherwise expressly and specifically defined.

In the present disclosure, the terms such as "connected", "fixed" and the like should be understood in a broad sense, unless otherwise expressly specified and defined. For example, "fixed" may mean "fixedly connected", "detachably connected", or "integrated with"; it may mean "mechanically connected" or "electrically connected"; it may mean "directly connected" or "indirectly connected through an intermediate medium"; and it may mean the intercommunication within two elements or the interaction relationship between two elements, unless otherwise expressly defined. For those skilled in the art, the specific meaning of the above terms in the present disclosure can be understood according to the specific situation.

In addition, the technical solutions between various embodiments of the present disclosure can be combined with each other, but it must be based on the condition that those skilled in the art can realize the combination. When a combination of technical solutions is contradictory or impossible to realize, it should be considered that this combination of the technical solutions does not exist and is not within the protection scope of the present disclosure.

The present disclosure provides an optical system and a virtual reality device.

Referring to FIG. 1, the optical system comprises a display unit 10 and a first lens 20, the first lens 20 is provided at a light emitting side of the display unit 10, the first lens 20 comprises a first surface 21 close to the display unit 10 and a second surface 22 away from the display unit 10, and the second surface 22 has a planar structure.

An optical splitter is provided between the first surface 21 and the display unit 10.

A first phase retarder 30 and a polarization reflector 40 are provided at a side of the first lens 20 away from the display unit 10, and the first phase retarder 30 is provided between the first lens 20 and the polarization reflector 40.

The light emitted from the display unit 10 enters into the first lens 20 from the first surface 21, is sequentially reflected by the second surface 22 and the first surface 21, and then the light exits the optical system from the second surface 22.

Here, when the second surface 22 has a planar structure, it is convenient for the assemblers to perform the coating operation on the second surface 22, thereby reducing the process cost and process risk of the coating process.

In the technical solutions proposed in the present application, the optical system comprises a first lens 20, which comprises a first surface 21 close to the display unit 10 and a second surface 22 away from the display unit 10. An optical splitter is provided between the first surface 21 and the display unit 10. A first phase retarder 30 and a polarization reflector 40 are provided at a side of the first lens 20 away from the display unit 10, and the first phase retarder 30 is provided between the first lens 20 and the polarization reflector 40. By providing the polarization reflector 40, the first phase retarder 30 and the optical splitter at two sides of the first lens 20, respectively, the light emitted from the display unit 10 only turns back between the first surface 21 and the second surface 22 of the first lens 20 after entering into the first lens 20, so that the optical path length of the optical system is increased. Therefore, the performance of the optical system is changed by increasing the optical path length, so that the problems that the volume of the virtual reality device is large, the virtual reality device is not convenient to carry around, and the wearing comfort for users is low cause by the large volume of the optical system in the prior art are solved.

The optical system further comprises a movable component connected with the display unit 10 to adjust the distance between the display unit 10 and the first lens 20. By changing the distance between the display unit 10 and the first lens 20 through the movable component, users with different degrees of myopia can clearly observe the display unit 10. Specifically, when the user is myopic, the parallel light rays are refracted by the dioptric system of the human eye, and then focus on a plane before the retina, so that the user cannot see the image of the display unit 10 clearly. By reducing the distance between the display unit 10 and the first lens 20, the light emitted from the display unit 10 can fall on the user's retina, so that the user can see the image clearly. In a preferred embodiment, the adjustment range of the movable component for the distance between the display unit 10 and the first lens 20 is 140 to 2000 mm, which is convenient for different myopic or hyperopic users to wear and use.

In the technical solutions proposed in the present application, the optical system comprises a first lens 20, which comprises a first surface 21 close to the display unit 10 and a second surface 22 away from the display unit 10. An optical splitter is provided between the first surface 21 and the display unit 10. A first phase retarder 30 and a polarization reflector 40 are provided at the side of the first lens 20 away from the display unit 10, and the first phase retarder 30 is provided between the first lens 20 and the polarization reflector 40. By providing the polarization reflector 40, the first phase retarder 30 and the optical splitter at two sides of the first lens 20, respectively, the light emitted from the display unit 10 can turn back after entering into the first lens 20, so that the optical path length of the optical system is increased. Therefore, the performance of the optical system is changed by increasing the optical path length, so that the problems that the volume of the virtual reality device is large, the virtual reality device is not convenient to carry around, and the wearing comfort for users is low cause by the large volume of the optical system in the prior art are solved.

The first light emitted from the display unit 10 sequentially passes through the optical splitter, the first lens 20 and the first phase retarder 30, and then the first light is converted into first linearly polarized light. Since the polarization direction of the first linearly polarized light is the same as the reflection direction of the polarization reflector 40, the first linearly polarized light is reflected by the polarization reflector 40, and then passes through the first phase retarder 30, and the first linearly polarized light is converted into first circularly polarized light by the first phase retarder 30. After passing through the first lens 20, the first circularly polarized light is reflected by the optical splitter, and is converted into second circularly polarized light from the first circularly polarized light, and the rotatory direction of the second circularly polarized light is opposite to the rotatory direction of the first circularly polarized light. After the second circularly polarized light sequentially passes through the first lens 20 and the second lens 50, the second circularly polarized light passes through the first phase retarder 30, and is converted into second linearly polarized light from the second circularly polarized light. Since the polarization direction of the second linearly polarized light is the same as the transmission direction of the polarization reflector 40, after the second linearly polarized light passes through the polarization reflector 40 and then passes through the second lens 50, the second linearly polarized light arrived at the human eyes.

In an optional embodiment, the optical system satisfies the following relationship: $50<\mathrm{ABS}(R1)<100$, $\mathrm{ABS}(\mathrm{Conic1})<5$, wherein R1 is the curvature radius of the first surface 21, and ABS(R1) is the absolute value of R1, Conic1 is the conic coefficient of the first surface 21, and ABS (Conic1) is the absolute value of Conic1. Specifically, the curvature radius represents the degree of curvature of the curved surface, and the conic coefficient represents the aspheric quadric surface coefficient in the curved surface function of the aspheric structure. In a specific embodiment, the shape of the aspheric structure is represented by the curvature radius and the conic coefficient.

In an optional embodiment, the optical system satisfies the following relationship: $5<T1<10$, wherein T1 is the central thickness of the first lens 20 along the optical axis.

In an optional embodiment, the optical system satisfies the following relationship: $10<T2\leq16$, wherein T2 is the distance from the first surface 21 to the display unit 10.

In an optional embodiment, the optical system satisfies the following relationship: $3<L1<5$, wherein L1 is the edge thickness of the first lens 20.

In an optional embodiment, the optical system satisfies the following relationship: $f=6.3*f1$, wherein f is the focal length of the optical system, and f1 is the focal length of the first lens 20.

In an optional embodiment, the optical system further comprises a second lens 50, which is provided at the light exiting side of the first lens 20. Specifically, the second lens 50 may be provided between the first lens 20 and the display unit 10, or may be provided at the side of the first lens 20 away from the display unit 10.

In a specific embodiment, the second lens 50 is provided between the first lens 20 and the display unit 10. The second lens 50 may be any one of a plano-convex lens, a plano-concave lens and a meniscus lens. According to the focal length requirements for the optical system, the focal power of the optical system may be adjusted by the coordination of the second lens 50 and the first lens 20. It can be understood that the surface structure of the second lens 50 may be a spherical structure, an aspheric structure, a free-form surface or a Fresnel structure.

Referring to FIGS. 5 to 9, in another specific embodiment, the second lens 50 is provided at the side of the first lens 20 away from the display unit 10, and the second lens 50 may be a plano-convex lens, a plano-concave lens or a meniscus lens. According to the focal length requirements for the optical system, the focal power of the optical system may be adjusted by the coordination of the second lens 50 and the first lens 20. It can be understood that the surface structure of the second lens 50 may be a spherical structure, an aspheric structure, a free-form surface or a Fresnel structure.

In a preferred embodiment, the first lens 20 and the second lens 50 may be provided to be spaced apart from each other or in close contact with each other. It can be understood that the second lens 50 may also be connected with the first lens 20 by adhering. In another embodiment, when the second lens 50 is provided between the first lens 20 and the display unit 10, the surface of the second lens 50 close to the display unit 10 is connected with the display unit 10 by adhering, and a side of the second lens 50 close to the first lens 20 is connected with the first lens 20 by adhering.

In an optional embodiment, the optical system further comprises a polarizer provided at a side of the polarization reflector 40 and the display unit 10. Specifically, when the light emitted from the display unit 10 is converted into the second linearly polarized light after being refracted and reflected, the second linearly polarized light passes through the polarization reflector 40. In order to improve the polarization purity of the second linearly polarized light, the polarizer is provided at the side of the polarization reflector 40 away from the display unit 10, and the polarization direction of the polarizer is the same as that of the second linearly polarized light, so that the stray light in other polarization directions in the second linearly polarized light can be blocked, and the polarization purity of the second linearly polarized light can be improved.

First Embodiment

In the first embodiment, the design data of the optical system is shown in Table 1:

TABLE 1

| Surf | Surface | Surface Type | Curvature Radius | Thickness | Aperture | Conic Coefficient |
|---|---|---|---|---|---|---|
| Pupil | | spherical | infinite | −1500 | 3575.261 | 0 |
| Aperture Diaphragm | | spherical | infinite | 13 | 4 | 0 |
| First Lens 20 | second surface 22 | spherical | infinite | 6.5 | 40.8 | 0 |
| | first surface 21 | aspheric | −84.13896 | 15.9 | 40.8 | 1.148573 |
| Protective Glass | | spherical | infinite | 0.5 | 39.59246 | 0 |
| Display Unit 10 | | spherical | infinite | 0.0148665 | 39.56288 | 0 |
| | | spherical | | | | |

Here, the first surface 21 has an aspheric structure in which A4, A6, A8 and A10 are aspheric high-order coefficients of the aspheric lens which are shown in Table 2.

TABLE 2

| Optical Element | A4 | A6 | A8 | A10 |
|---|---|---|---|---|
| Second Surface 22 | −2.68E−07 | 3.928E−09 | −7.5E−12 | 5.287E−15 |

Here, A4, A6, A8 and A10 are used to represent the even-order conic coefficients of the aspheric surface.

Here, the first surface 21 has an even-order aspheric structure, wherein the even-order aspheric surface satisfies the following relationship:

$$z = \frac{CY^2}{1+\sqrt{1-(1+k)C^2Y^2}} + \sum_{i=2}^{N} \alpha_i Y^{2i},$$

wherein Y is the height of the center of the lens surface, Z is the displacement value of the position with the height Y of the aspheric structure along the optical axis from the optical axis with the surface vertex as the reference, C is the curvature radius at the vertex of the aspheric surface, K is the conic coefficient, and $\alpha_i$ represents the aspheric coefficient of the i-th order.

In another embodiment, the second surface 22 may have an odd-order aspheric structure, wherein the odd-order aspheric surface satisfies the following relationship:

$$z = \frac{CY^2}{1+\sqrt{1-(1+k)C^2Y^2}} + \sum_{i=2}^{N} \beta_i Y^{i},$$

wherein Y is the height of the center of the lens surface, Z is the displacement value of the position with the height Y of the aspheric structure along the optical axis from the optical axis with the surface vertex as the reference, C is the curvature radius at the vertex of the aspheric surface, K is the conic coefficient, and (3, represents the aspheric coefficient of the i-th order.

Figure 2:
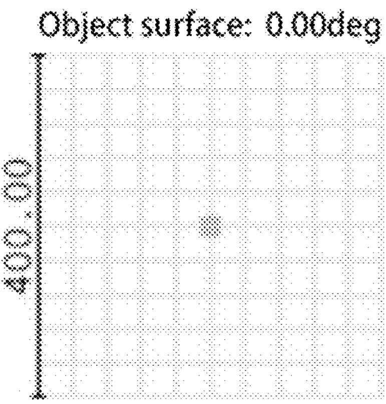
FIG. 2 is a spot diagram of the optical system of the first embodiment of the present disclosure.
Figure 2:
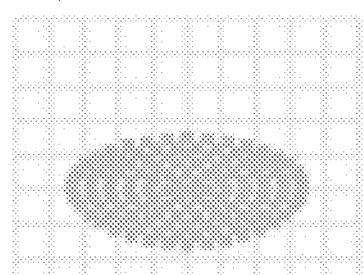
Figure 2:
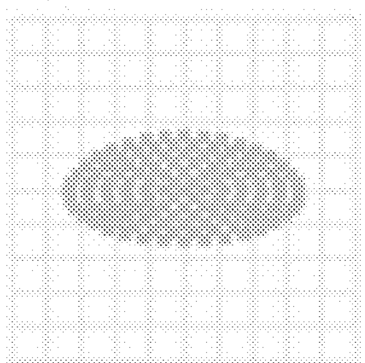

Referring to FIG. 2, FIG. 2 is a spot diagram of the first embodiment, the spot diagram refers to that the intersection of light rays emitted from a point and the image surface is no longer concentrated at the same point due to aberration, but forms a dispersion pattern scattered in a certain range after the light rays pass through the optical system, and the spot diagram is used to evaluate the imaging quality of the projection optical system. In the first embodiment, the maximum value of the image point in the spot diagram corresponds to the maximum field of view, and the maximum value of the image point in the spot diagram is less than 80 μm.

Figure 3:
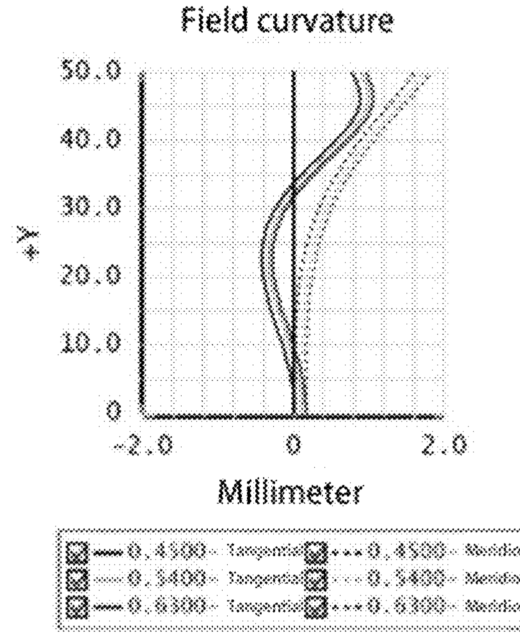
FIG. 3 is a diagram showing field curvature and distortion of the optical system of the first embodiment of the present disclosure.
Figure 3:
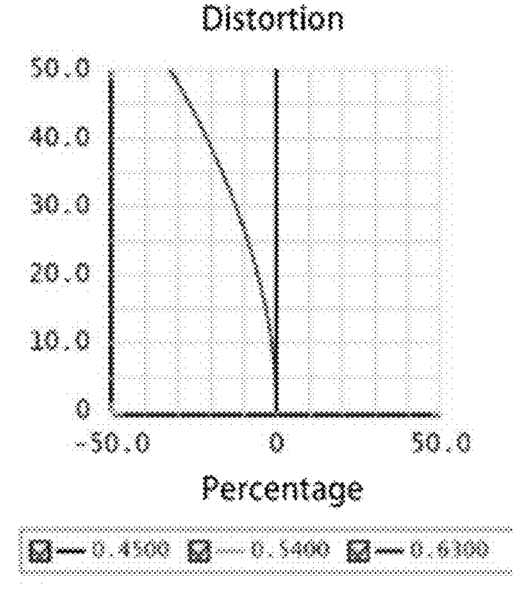

Referring to FIG. 3, FIG. 3 is a diagram showing field curvature and optical distortion of the first embodiment, wherein the field curvature represents the position change of beam image points at different field points away from the image surface, and the optical distortion refers to the vertical axis distance from the intersection of the main light at the main wavelength of a certain field of view and the image surface to the ideal image point. In the first embodiment, the field curvature in the tangent surface and the sagittal surface is less than ±2 mm, and the maximum field curvature difference between the tangent surface and the sagittal surface is less than 1 mm, wherein the maximum distortion is the distortion at the maximum field of view, and the maximum distortion is less than 32.4%.

Figure 4:
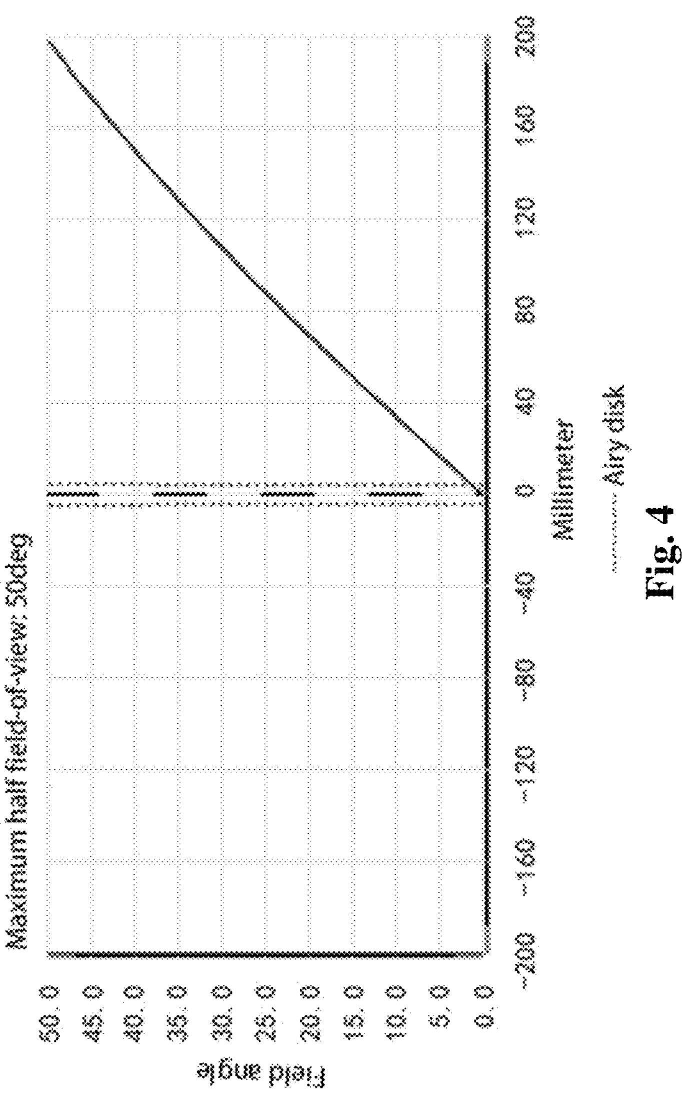
FIG. 4 is a diagram showing vertical axis chromatic aberration of the optical system of the first embodiment of the present disclosure.
Figure 5:
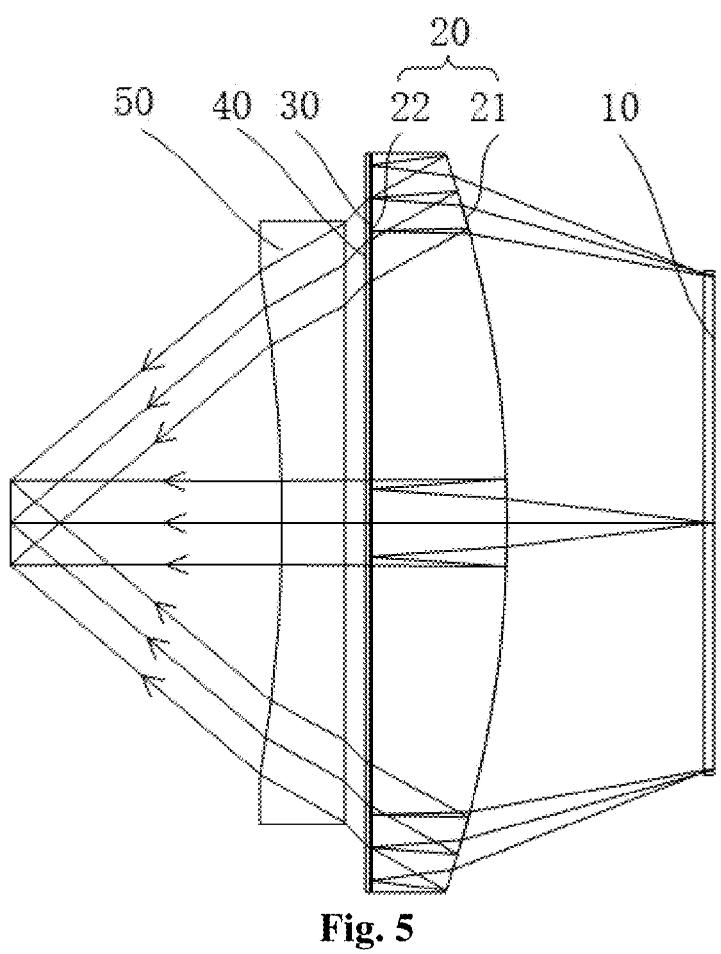
FIG. 5 is a schematic diagram of the optical path of the optical system of another embodiment of the present disclosure.
Figure 6:
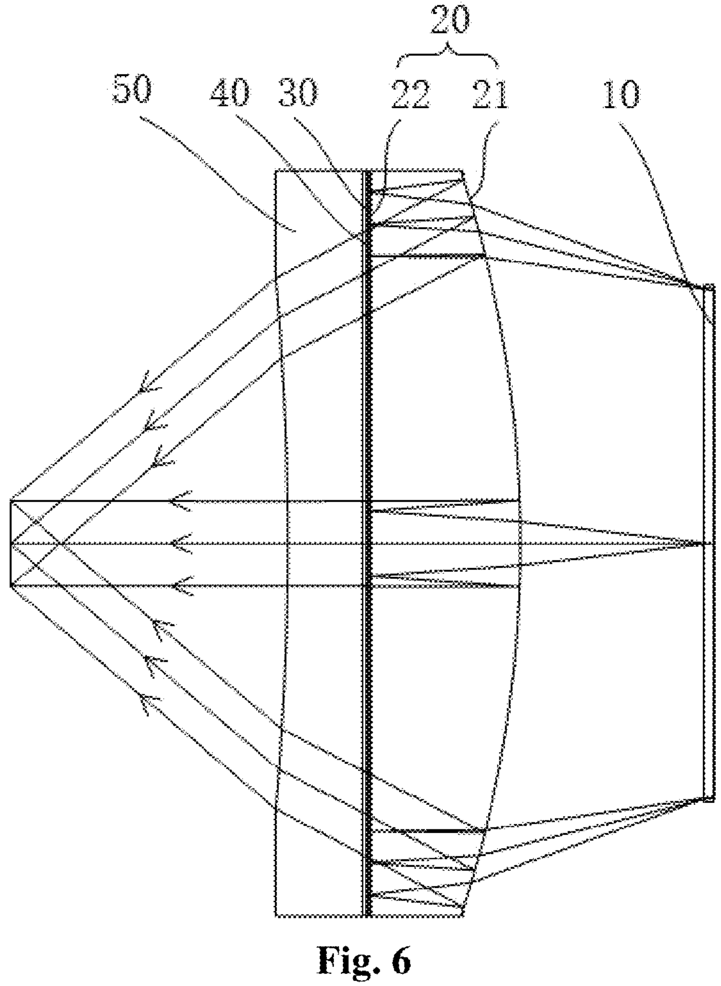
FIG. 6 is a schematic diagram of the optical path of the optical system of another embodiment of the present disclosure.
Figure 7:
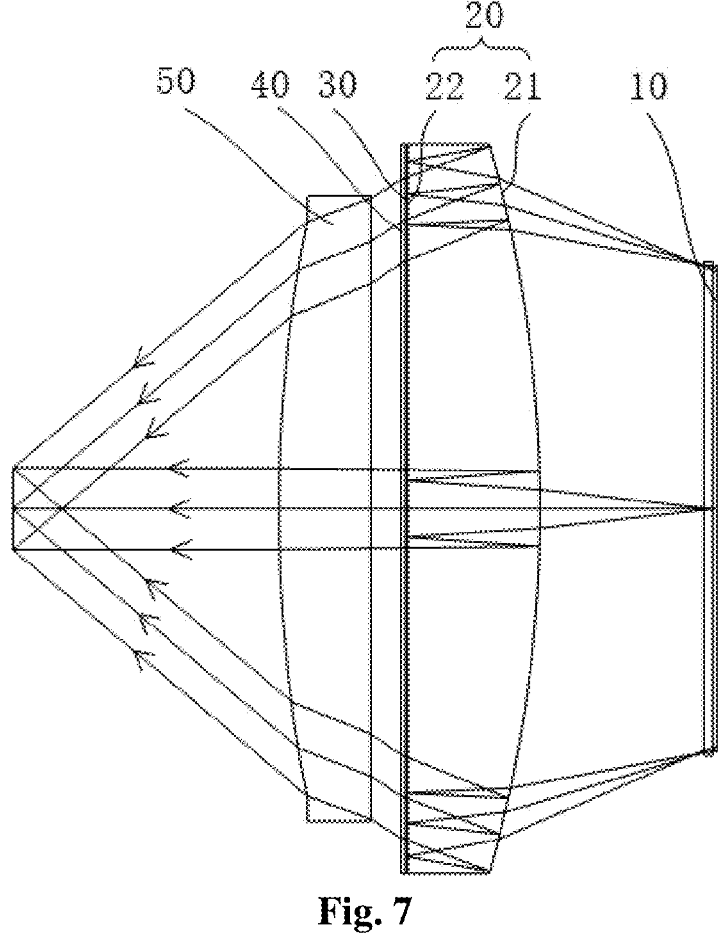
FIG. 7 is a schematic diagram of the optical path of the optical system of another embodiment of the present disclosure.
Figure 8:
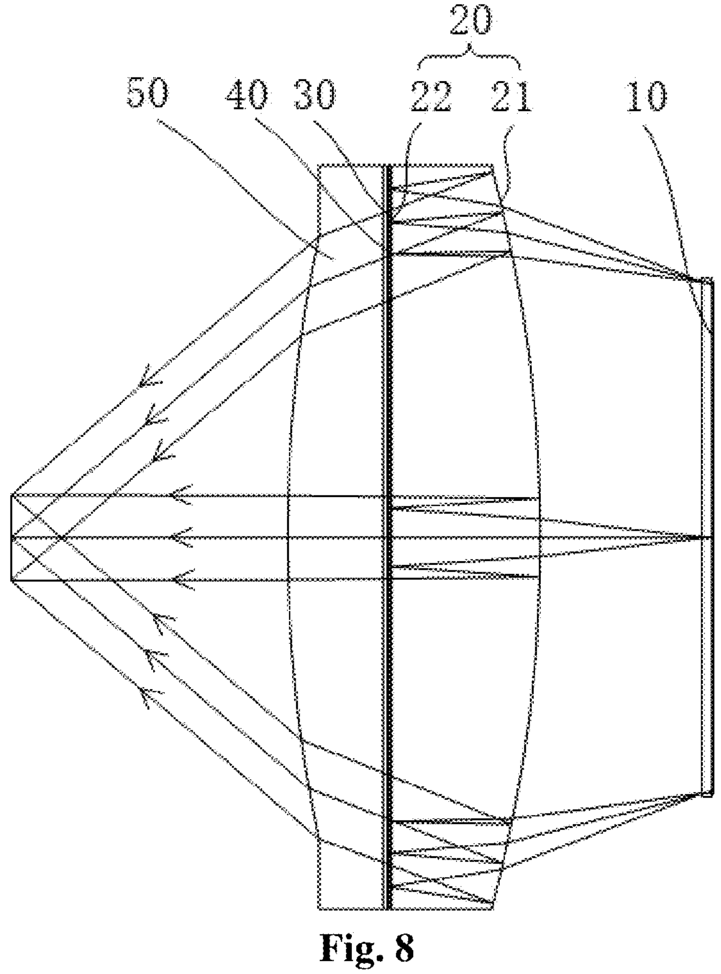
FIG. 8 is a schematic diagram of the optical path of the optical system of another embodiment of the present disclosure.
Figure 9:
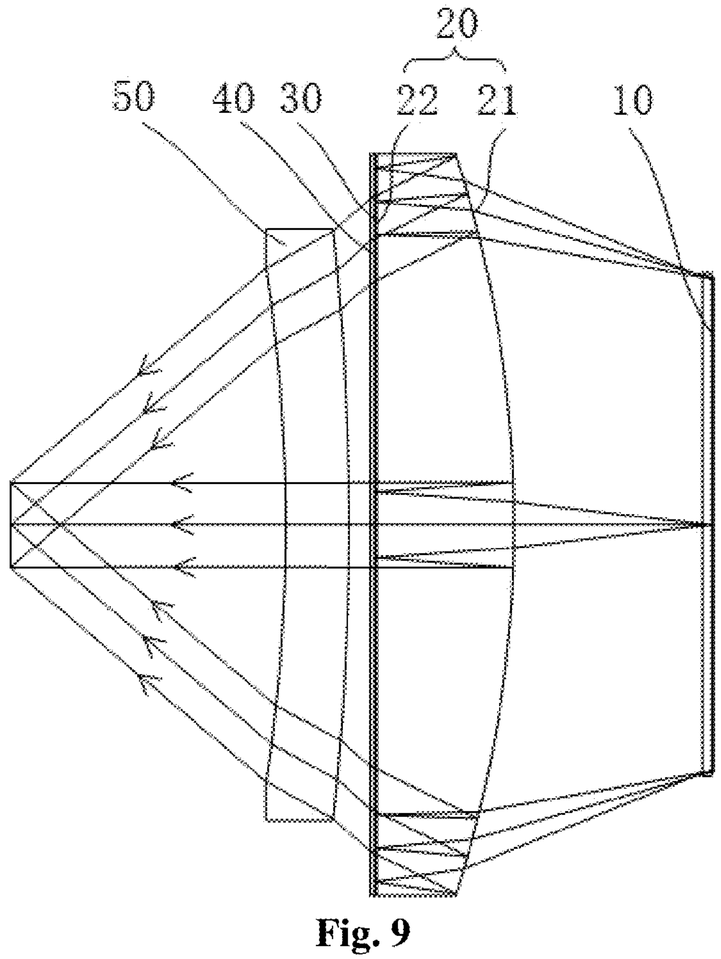
FIG. 9 is a schematic diagram of the optical path of the optical system of another embodiment of the present disclosure.

Referring to FIG. 4, FIG. 4 is a diagram showing vertical axis chromatic aberration of the first embodiment, wherein the vertical axis chromatic aberration is also called lateral chromatic aberration, which mainly refers to the difference between the focus points of hydrogen blue light and hydrogen red light at the image surface after a polychromatic main light ray at the object side becomes multiple light rays when it is emitted from the image side due to the dispersion of the refraction system. In the first embodiment, the maximum dispersion of the optical system is the dispersion at the position of the maximum field of view of the optical system, and the maximum chromatic aberration value of the optical system is less than 198 μm, which can meet the needs of users with later software correction.

In the first embodiment, the total length of the optical system is less than 24 mm, and the maximum field angle of the optical system is greater than or equal to 100 degrees, so that clear imaging is ensured. On the premise of satisfying the user's viewing experience, the volume of the optical system is reduced by folding the optical path, so that the volume and weight of the virtual reality device is reduced and the user's experience is improved.

The present disclosure also proposes a virtual reality device, which comprises an optical system according to any of the embodiments described above. The specific structure of the optical system may refer to the above embodiments. Since the optical system adopts all the technical solutions of all the above embodiments, it has at least all the beneficial effects brought by the technical solutions of the above embodiments, which will not be repeated here.

The above embodiments are only the preferred embodiments of the present disclosure, and do not limit the patent scope of the present disclosure. Under the inventive concept of the present disclosure, the equivalent structural transformation made by using the contents of the description and drawings of the present disclosure, and the direct/indirect application in other relevant technical fields all fall into the patent protection scope of the present disclosure.

What is claimed is:

1. An optical system, comprising a display unit and a first lens sequentially along a light transmission direction, wherein the first lens is provided at a light emitting side of the display unit, the first lens comprises a first surface close to the display unit and a second surface away from the display unit, and the second surface has a planar structure, wherein an optical splitter is provided between the first surface and the display unit, wherein a first phase retarder and a polarization reflector are provided at a side of the first lens away from the display unit, and the first phase retarder is provided between the first lens and the polarization reflector, wherein light emitted from the display unit is split into a reflected first beam and a transmitted second beam by the optical splitter, wherein the second beam sequentially passes through the first lens and the first phase retarder and is reflected by the first polarization reflector, wherein the second beam reflected by the first polarization reflector sequentially passes through the first phase retarder and the first lens, and is split into a reflected second-first beam and a transmitted second-second beam by the optical splitter, and wherein the second-first beam sequentially passes through the first lens, the first phase retarder and the first polarization reflector to arrive at eyes of a user.

2. The optical system according to claim 1, wherein the optical system further comprises a movable component connected with the display unit to adjust a distance between the display unit and the first lens.

3. The optical system according to claim 1, wherein the optical system satisfies following relationships: 50<ABS(R1)<100, ABS(Conic1)<5, wherein R1 is a curvature radius of the first surface, and ABS(R1) is an absolute value of R1, and wherein Conic1 is a conic coefficient of the first surface, and ABS(Conic1) is an absolute value of Conic1.

4. The optical system according to claim 1, wherein the optical system satisfies a following relationship: 5<T1<10, and wherein T1 is a central thickness of the first lens along an optical axis.

5. The optical system according to claim 1, wherein the optical system satisfies a following relationship: 10<T2≤16, and wherein T2 is a distance from the first surface to the display unit.

6. The optical system according to claim 1, wherein the optical system satisfies a following relationship: 3<L1<5, and wherein L1 is an edge thickness of the first lens.

7. The optical system according to claim 1, wherein the optical system satisfies a following relationship: f=6.3*f1, and wherein f is a focal length of the optical system, and f1 is a focal length of the first lens.

8. The optical system according to claim 1, wherein the optical system further comprises a second lens provided at a light exiting side of the first lens, and wherein the second lens is any one of a plano-convex lens, a plano-concave lens and a meniscus lens.

9. The optical system according to claim 1, wherein the optical system further comprises a polarizer provided at a side of the polarization reflector away from the phase retarder.

10. A virtual reality device, comprising:

a housing; and and the optical system according to claim 1, wherein the optical system is accommodated in the housing.

* * * * *